US008229605B2

(12) United States Patent
Vlad

(10) Patent No.: US 8,229,605 B2
(45) Date of Patent: Jul. 24, 2012

(54) AVIATION APPLICATION SETTING ANTENNA ARRAY AND INTEGRATED TEMPERATURE SENSOR

(75) Inventor: Ovidiu Gabriel Vlad, Naperville, IL (US)

(73) Assignee: Embedded Control Systems Inc., Bolingbrook, IL (US)

( * ) Notice: Subject to any disclaimer, the term of this patent is extended or adjusted under 35 U.S.C. 154(b) by 264 days.

(21) Appl. No.: 12/779,495

(22) Filed: May 13, 2010

(65) Prior Publication Data

US 2011/0282521 A1 Nov. 17, 2011

(51) Int. Cl.
*G01C 23/00* (2006.01)

(52) U.S. Cl. ............ 701/3; 343/705; 343/708; 375/148; 375/232; 340/870.17

(58) Field of Classification Search ...... 701/3; 343/705, 343/708, 700 MS; 375/148, 232; 340/870.17
See application file for complete search history.

(56) References Cited

U.S. PATENT DOCUMENTS 5,021,792 A 6/1991 Hwang
5,255,890 A 10/1993 Thomas et al.
6,272,349 B1 8/2001 McGrath et al.
6,856,295 B2 2/2005 Desargant et al.
6,944,450 B2 9/2005 Cox
6,988,026 B2 * 1/2006 Breed et al. .................. 701/31.4
7,023,390 B1 * 4/2006 Kim et al. ..................... 343/705
7,116,703 B2 10/2006 Bouillet et al.
7,474,230 B2 * 1/2009 Blom et al. .............. 340/870.04
2008/0246670 A1 10/2008 Vlad et al.
2010/0039290 A1 * 2/2010 Mitchell et al. .......... 340/870.17
2011/0280279 A1 * 11/2011 Gregory et al. ............... 374/152

FOREIGN PATENT DOCUMENTS

EP 0392897 A1 10/1990
EP 0279050 B1 8/1993
EP 0913676 A1 5/1999
JP 60035230 A1 2/1985
WO 2008077104 A1 6/2008
WO 2008156893 A2 12/2008

OTHER PUBLICATIONS

Related International Patent Application No. PCT/US08/59217; Search Report dated Dec. 10, 2008, 9 pages.
Related International Patent Application No. PCT/US07/88142; Search Report dated May 5, 2008, 10 pages.
Ranson et al., "Modeling the Fluorescent Lifetime of Y203:Eu" Applied Physics Letters, AIP, American Institute of Physics, vol. 72, No. 21, May 25, 1998, 2 pages.

* cited by examiner

*Primary Examiner* — Toan To
(74) *Attorney, Agent, or Firm* — Fitch, Even, Tabin & Flannery, LLP

(57) ABSTRACT

An antenna array for use in an aviation application setting comprises an external covering and at least four radio frequency antennas that are disposed underneath and that are protected by the external covering. A deposit of phosphor material is also disposed beneath this covering. This external covering is at least partially permeable to radio frequency signals and will provide at least a substantial barrier against external moisture and objects that might otherwise harm the antennas. This external covering can be fixed to an exterior surface of an aircraft. The four radio frequency antennas are electrically discrete from one another though also being configured as an integral mechanical structure. The phosphor material, in turn, can serve to facilitate detection of a parameter of interest, such as temperature or airspeed.

20 Claims, 6 Drawing Sheets

AVIATION APPLICATION SETTING ANTENNA ARRAY AND INTEGRATED TEMPERATURE SENSOR

TECHNICAL FIELD

This invention relates generally to aircraft and more particularly to wireless communications in an aviation application setting.

BACKGROUND

Modern aircraft typically include a variety of wireless reception and/or transmission platforms, many of which are primarily or even exclusively intended for aviation purposes. Some examples include, but are certainly not limited to, global positioning system receivers, VOR transceivers, marker beacon receivers, aircraft transponder transceivers, ILS receivers, ELT transmitters, TCAS receivers, ADS-B receivers, data link weather receivers, and two-way voice communications transceivers of various kinds (including but not limited to terrestrial cellular telephony, satellite-based communications, VHF push-to-talk transceivers, and so forth), to note but a few relevant examples.

In general, each of these platforms comprises a discrete and independent entity. While an occasional exception occurs (such as a combined cellular telephone and a GPS receiver), each such platform typically comprises a separate radio having it's own dedicated antenna, RF front end, RF back end, and user interface. For the most part such radios are typically either mounted in a corresponding cabinet in the cockpit or comprise discrete cards (comprising the RF front and back end sections) that are mounted in a shared user interface platform. The various antennas for these cockpit-disposed radios are typically mounted in various locations external to the fuselage of the aircraft, often at some large distance from the radios themselves.

Such prior art practices are successful with respect to ensuring the availability of a successfully operable plurality of radio platforms. There remain, nevertheless, a number of unmet needs. Volume and weight both comprise important considerations for avionics equipment, with both contributing in part to the carrying capacity of the aircraft and the cost of operating that aircraft. Present approaches tend to represent both considerable weight and space requirements. Design for maintainability also comprises an important consideration in an aviation application setting. Present approaches can present challenges in this regard both with respect to ease and cost of effecting necessary repairs.

In addition, various operating parameters are of considerable interest to the person or persons piloting an aircraft. Airspeed is an example of one such operating parameter.

BRIEF DESCRIPTION OF THE DRAWINGS

The above needs are at least partially met through provision of the aviation application setting antenna array and integrated temperature sensor described in the following detailed description, particularly when studied in conjunction with the drawings, wherein.

Figure 1:
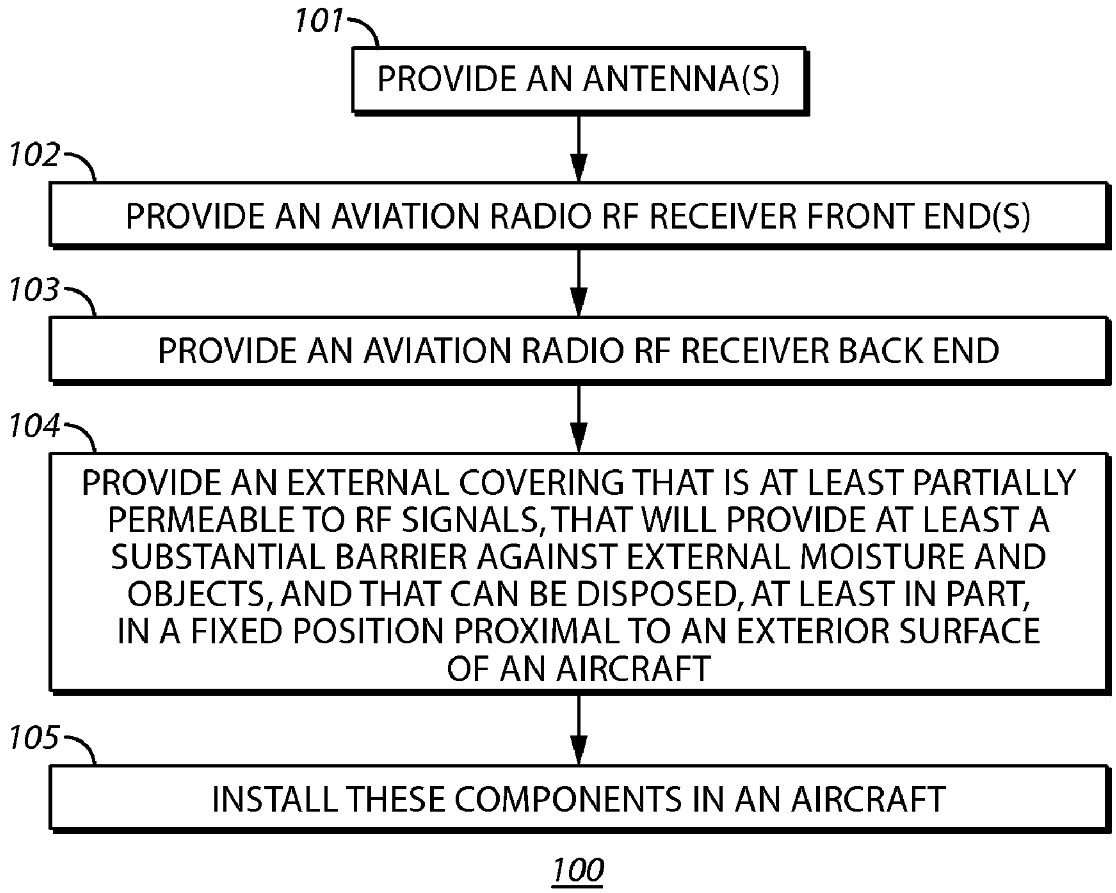
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, an antenna array for use in an aviation application setting comprises an external covering and at least four radio frequency antennas and a phosphor material that is exposed to an ambient condition of interest that are disposed underneath and that are protected by the external covering. This external covering is at least partially permeable to radio frequency signals and will provide at least a substantial barrier against external moisture and objects that might otherwise harm the antennas. This external covering is also configured and arranged to be disposed, at least in part, in a fixed position proximal to an exterior surface of an aircraft.

The four (or more) radio frequency antennas are electrically discrete from one another and are each configured and arranged to receive radio frequency signals for a corresponding different radio frequency platform. These four (or more) radio frequency antennas are also configured and arranged as an integral mechanical structure.

These teachings will readily accommodate a greater number of antennas. For example, there may be six, twelve, or even a greater number of antennas as desired. By one approach, essentially all antenna requirements for a given aircraft can be accommodated by this single integrated structure. If desired, some or all of these antennas can comprise discrete microstrip patch antennas that are disposed on a shared substrate such as, but not limited to, a printed wiring board. These teachings will also accommodate, if desired, inclusion of one or more broadband antennas that are arranged and configured to receive radio frequency signals for a corresponding plurality of different radio frequency platforms.

The external covering can be shaped, if desired, as an aviation-radome having, for example, a low profile oval form factor. By one approach the material comprising the external covering can itself serve to aid in electro/magnetically isolating one of more of the antennas from other of the antennas. For example, the dielectric material comprising the external covering can have varying thicknesses to thereby provide differing quantities of such material in close proximity to certain of the antennas. It would also be possible to vary the material composition itself and/or to provide for variations in one or more coatings as are disposed on the external covering to achieve such isolation.

So configured, these teachings are readily scaled such that a large number of antennas can be accommodated in a relatively small area. This, in turn, permits the installation of only a relatively small, light antenna array. This approach provides for reduced space requirements as well as reduced weight requirements as compared to typical prior art approaches in aviation application settings. This approach also facilitates ease of maintenance and will further be seen to permit further improvements with respect to accommodating and leveraging new and unique overall aviation radio architectures.

These teachings will also accommodate providing at least one optical conduit that direct a pulse of light energy from a light source to the aforementioned phosphor material. Similarly, another one or more optical conduits can be used to transport light that occurs when the phosphor material begins to fluoresce in response to the pulse of light energy. The duration of time between directing the pulse of light energy to the phosphor material and detecting when the phosphor material begins to fluoresce in response to that pulse of light energy can then be measured and used to determine a metric regarding the ambient condition of interest.

By one approach, this pulse of light energy can comprise, solely or in substantial part, ultraviolet light if desired. Also if desired, the same optical conduit can be used for both functions noted above (that is, directing the light energy from the light source to the phosphor material and guiding the resultant fluoresce light to a corresponding sensor).

As the duration of time required by a given phosphor material to respond to a simulation of light will vary predictably as a function of ambient temperature conditions as pertain to the phosphor material, the measured duration of time can therefore be used to determine, for example, the temperature of the phosphor material and hence (at least under some operating conditions) the local temperature in the vicinity of the phosphor material. This can comprise, for example, the local air temperature, the temperature of an object upon which the phosphor material is located, and so forth.

These teachings will also accommodate directing a pulse of heating light energy from a heating light source to the phosphor material to thereby quickly heat the phosphor material to a higher temperature. By employing the previously described steps both before and after heating the phosphor material in this manner, one can readily calculate, for example, the speed at which cooling air is passing by the phosphor material to achieve a particular amount of cooling over a particular period of time. In an aircraft setting, this approach can serve to determine, for example, a condition of interest such as the airspeed of the vehicle.

By employing light in this manner, those skilled in the art will recognize and appreciate that these teachings are readily, conveniently, and economically deployed in an application setting that makes use of a distributed light network for power distribution, data networking, and/or lighting needs. These teachings are highly leverageable and are also readily scaled to accommodate a wide variety of application setting requirements and/or opportunities.

Figure 2:
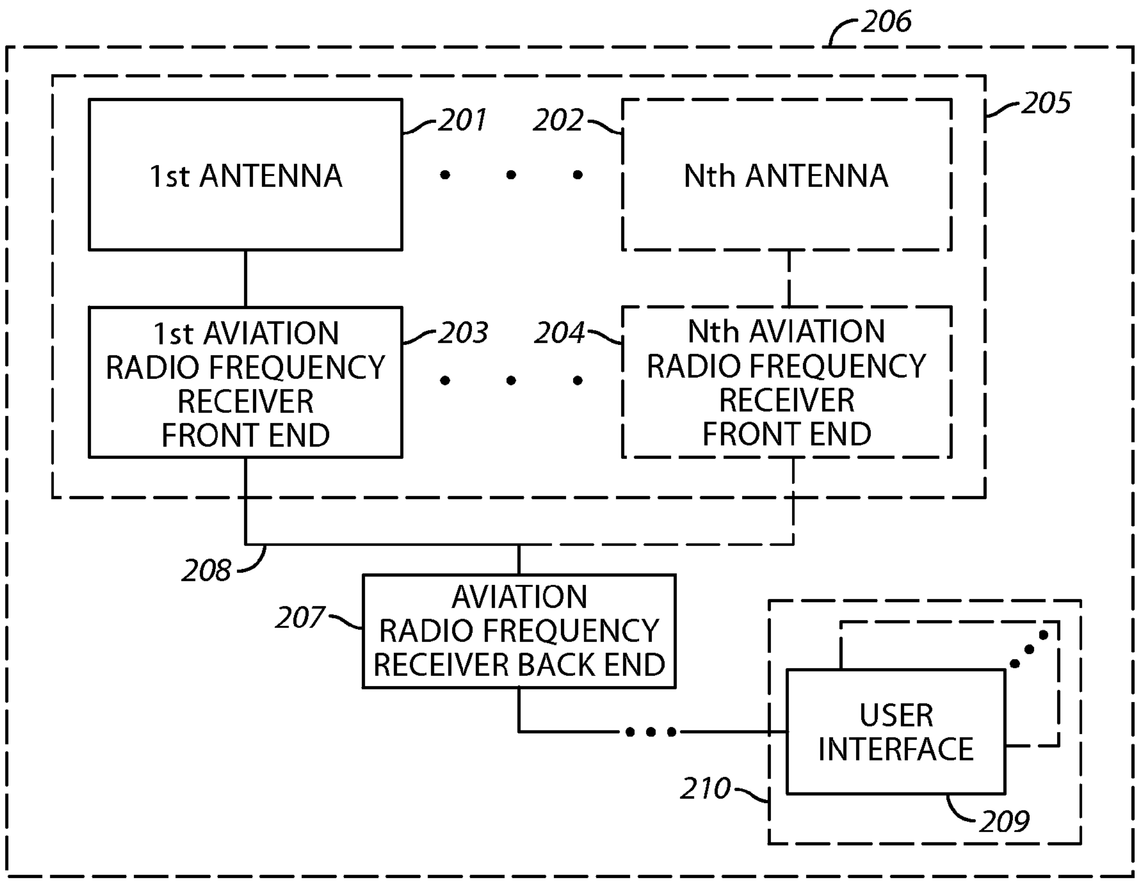
FIG. 2 comprises a block diagram as configured in accordance with various embodiments of the invention.

These and other benefits may become clearer upon making a thorough review and study of the following detailed description. Referring now to the drawings, and in particular to FIG. 1, an illustrative process 100 suitable to represent at least certain of these teachings will be described. This process 100 provides first for provision 101 of one or more antennas as shown in FIG. 2. This antenna(s) 201 may be configured and arranged to receive radio frequency (RF) signals for a corresponding radio frequency platform (or platforms in the case of multiple antennas) as described in more detail below. When this step comprises providing a plurality of antennas 201, 202 (where "N" as shown in FIG. 2 will be understood to refer to any integer greater than one) such as, for example, four antennas, these antennas may be electrically discrete from one another.

Figure 3:
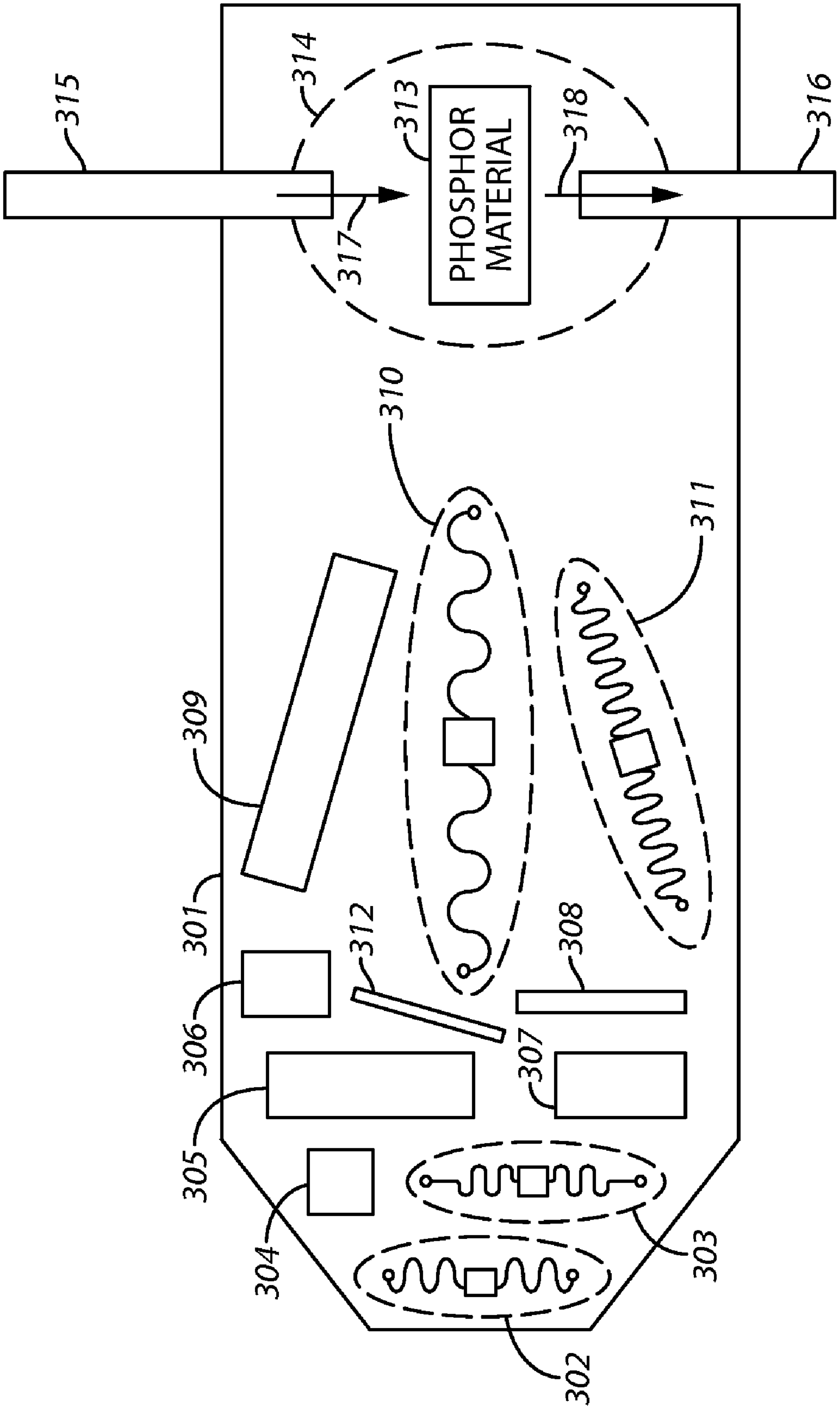
FIG. 3 comprises a plan schematic view as configured in accordance with various embodiments of the invention.

By one approach, and referring now momentarily to FIG. 3, this can comprise providing a plurality of antennas 302 through 311 that share a common component substrate 301 comprised at least in part, for example, of printed wiring board material or the like. One or more of these antennas can comprise discrete microstrip patch antennas as suggested in this illustration. The manufacture and use of such patch antennas is well known in the art and requires no further elaboration here. So configured, these antennas can each have a corresponding integral ground plane and, if desired, two or more of these integral ground planes can be electrically coupled in common with one another. By one approach, a multi-layer printed wiring board 301 that serves as the mounting substrate for such antennas can include one or more layers that serve as such ground planes. As with patch antennas themselves, the formation and use of such a ground plane is also well known in the art and requires no additional description here.

Figure 4:
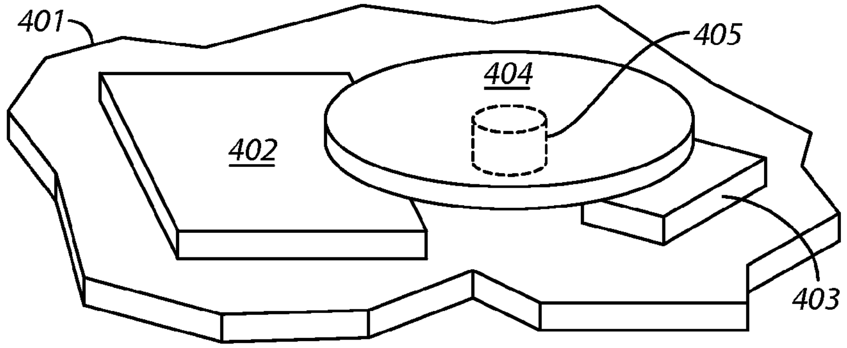
FIG. 4 comprises a perspective detail view as configured in accordance with various embodiments of the invention.

By one approach, each such antenna can share a same plane as each remaining antenna (as when all of the antennas are formed on a shared planar surface). These teachings will also accommodate, however, the use of differing planes to contain part or all of one or more such antennas. To illustrate this point, and referring momentarily to FIG. 4, a given substrate 401 can support, in a first plane, two patch antennas 402 and 403 while a third patch antenna 404 rests atop a pedestal 405 that raises the third patch antenna 404 to a plane above that which corresponds to the substrate 401. By this configuration, as shown, portions of two or more of the patch antennas are able to occupy a same footprint area. In this specific illustrative example, two of the patch antennas 402 and 403 are disposed, in part, beneath the third patch antenna 404.

These teachings will also accommodate a relatively dense population of such antennas notwithstanding their different aviation-related purposes and differing reception and/or transmission bands of interest. As one illustrative example in this regard, while the substrate 301 may be approximately only ten inches in length and approximately five inches in width, ten such antennas serving aviation purposes can be suitably and satisfactorily mounted in accordance with these teachings. In such an example, the following antennas can serve and correspond to the following indicated aviation purposes:

First antenna 302—VHF Com 20 W transmit 119-135 Mhz AM (vertically polarized);

Second antenna 303—Transponder high power transmit antenna (vertically polarized);

Third antenna 304—GPS reception;

Fourth antenna 305—400 Mhz SATCOM;

Fifth antenna 306—WX (or WSI) weather satellite reception;

Sixth antenna 307—Transponder receiver;

Seventh antenna 308—Cellular telephony (code division multiple access);

Eighth antenna 309—332 Mhz glideslope reception;

Ninth antenna 310—108-118.5 Mhz VOR/LOC reception; and

Tenth antenna 311—75 Mhz marker beacon reception.

Referring again to FIG. 3, it may be useful in some aviation application settings to configure such antennas in a manner that tends to provide some electro/magnetic isolation therebetween. By one approach, this can comprise intentionally orienting at least some of the antennas with respect to one another in a manner that increases such isolation. The antennas denoted by reference numerals 309, 310, and 311 have such an orientation.

By another approach, used alone or in conjunction with that mentioned above, electro/magnetic shields can be disposed between at least two such antennas to increase the electro/magnetic isolation therebetween. Such a shield 312 appears in FIG. 3 and serves, in this illustrative example, to aid in further isolating the antenna denoted by reference numeral 305 from the antenna denoted by reference numeral 310. Such a shield can be comprised, in part or in whole, of metal such as aluminum, copper, or gold and can have a shape and dimensions as may best serve the needs of a given application setting. (FIG. 3 illustrates only one such shield; those skilled in the art will recognize and understand that any number of such shields can be applied and that only one is shown here for the sake of simplicity and clarity.)

In the examples presented above, each antenna is configured and arranged by design and intent to receive and/or transmit primarily in service of a single band of interest and its corresponding purpose and functionality. If desired, however, one or more of these antennas can comprise a broadband antenna that is configured and arranged to receive RF signals for a corresponding plurality of different RF platforms.

The assembly also comprises a deposit of phosphor material 313. The phosphor material 313 can comprise a coating of phosphor material on a metal disk (not shown). That metal disk or other support substrate can serve to position the phosphor material 313 to thereby expose the phosphor material 313 to an ambient condition of interest 314 (such as, for example, temperature). Here, this comprises placing the disk/phosphor material underneath the aforementioned external covering. This can also comprise, for example, placing the disk/phosphor material in direct physical and thermal contact with an object whose temperature is to be assessed. The precise phosphorous material utilized can vary with the needs and/or opportunities presented by a specific application setting as will be understood by those skilled in the art.

A first optical conduit 315 serves to deliver pulsed light 317 from a light source (described below) to the phosphor material 313. A second optical conduit 316 serves to deliver light 318 that is given off when the phosphor material 313 begins to fluoresce in response to the pulse of light energy 317. In particular, this second optical conduit 316 can direct such resultant fluorescent light energy 318 to a light sensor (as described below) to thereby permit the detection of this event.

As illustrated, the two optical conduits 315 and 316 are physically discrete from one another. By one approach, if desired, and presuming the use of appropriate light path components as exist and as are well understood by those skilled in the art, only a single optical conduit can serve both roles. It would also be possible to employ of plurality of optical fibers for either or both of these optical pathways. Such options will be well understood by those skilled in the art and require no further elaboration here.

It may also be noted that any of a wide variety of lenses, light pipes, diffusion components, and the like (not shown) could be employed, if desired, to disperse the incoming pulse of light energy over a wide portion of the phosphor material and/or to collect the emitted fluorescent light for conveyance to the light sensor. Again, such components and their manner of use will be well understood by those skilled in the art. Accordingly, for the sake of brevity and simplicity further explanation in this regard will not be provided here.

Further details will be provided below to describe in further detail the use of this phosphor material 313. For now, however, this description will return to further elaboration with respect to the antenna array.

Referring again to FIG. 1, this process 100 then provides for provision 102 of one or more aviation radio RF receiver front ends. As used herein, "aviation radio RF receiver front end" will be understood to refer to that portion of an RF receiver that extends from an antenna input through an intermediate frequency section that provides as output an intermediate frequency signal as versus a baseband representation of the transmitted content. As illustrated in FIG. 2, that antenna input will be configured and arranged to operably couple to a corresponding one of the previously mentioned antennas 201, 202 such that each aviation radio RF receiver front end 203, 204 will receive its corresponding RF signals from a corresponding one of the antennas. (Those skilled in the art will recognize and understand that two or more such aviation radio RF receiver front ends may couple to a shared antenna when that shared antenna comprises a broadband antenna as described above.)

This aviation radio RF receiver front end (or front ends) is configured and arranged to receive RF signals for a corresponding different RF platform and can comprise any of a wide variety of aviation purpose-based platforms that each serve a corresponding different aviation operational purpose. Some examples include, but are not limited to:

- a global positioning system receiver;
- a very high frequency (VHF) two-way voice communications transceiver;
- a marker beacon receiver;
- a VHF Omni-directional Range (VOR) receiver;
- an aircraft transponder transceiver;
- an Instrument Landing System (ILS) receiver comprised of a localizer receiver and a glideslope receiver;
- an aircraft emergency locator transmitter (ELT);
- an aircraft satellite communications receiver (SatCom);
- a Traffic Alert Collision Avoidance System (TCAS) receiver;
- an Automatic Dependent Surveillance-Broadcast (ADS-B) receiver;
- a data link weather receiver;
- a cellular telephony transceiver; and/or
- a satellite-based commercial broadcast receiver.

As already noted above, there can be any number of such aviation RF receiver front ends. For example, pursuant to one application setting, there may be three such aviation RF receiver front ends. For another application setting, there may be six such aviation RF receiver front ends while for yet another application setting, there may be twelve such aviation RF receiver front ends. Those skilled in the art will recognize and understand that such examples are intended to serve only in an illustrative context and are not offered as an exhaustive listing of all possible examples in this regard.

By one approach, the aforementioned antenna(s) 201, 202 and aviation RF receiver front end(s) 203, 204 can all be configured and arranged to be disposed during use at least partially external 205 to an external periphery of an aircraft fuselage 206. If desired, these components can further all be so disposed in close physical proximity to one another (as when, for example, such components are all located within only a very few inches or fractions of an inch of one another). To illustrate, and referring momentarily to FIG. 5, a plurality of antennas 501 as described above along with a plurality of aviation RF receiver front ends 502 can be mounted exterior 205 to an aircraft fuselage 206. By one approach, if desired, both the antennas 501 and the aviation RF receiver front ends 502 can be mounted on opposing sides of a shared multi-layer printed wiring board. By another approach, such components can be mounted on separate substrates, which substrates are themselves combined together as a shared physical form factor.

Those skilled in the art will recognize and appreciate that, although comprising a very different approach to that usually seen in an aviation application setting, such teachings serve to greatly reduce the volume and weight requirements that would otherwise typically be associated with a plurality of aviation radio platforms. Maintenance and repair operations are also greatly simplified via such an architectural approach.

Referring again to FIGS. 1 and 2, these teachings then provide for provision of an aviation RF receiver back end 207. As used herein, the expression "aviation RF receiver back end" will be understood to refer to that portion of a radio that receives an intermediate frequency signal and that further processes that signal to yield baseband, demodulated, and recovered bearer content. Such functionality can be provided, in whole or in part, through use of one or more appropriately programmed digital signal processing sections that ultimately output demodulated content as corresponds to received wireless signals. As the present teachings are not overly sensitive to the selection of any particular approach in this regard, for the sake of brevity and the preservation of clarity additional elaboration in this regard will not be provided here.

Figure 5:
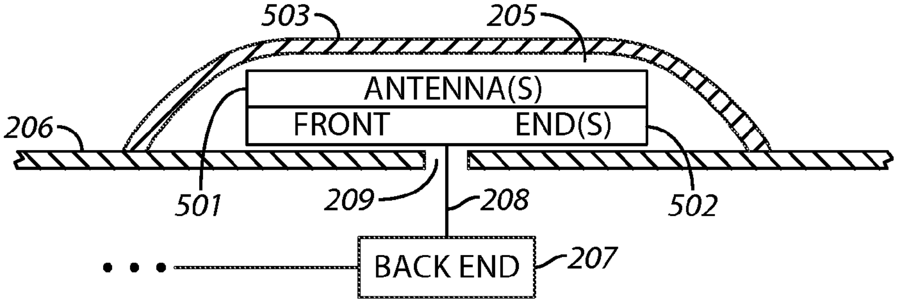
FIG. 5 comprises a side elevational sectioned view as configured in accordance with various embodiments of the invention.

This aviation RF receiver back end 207 can also be disposed closely proximal to the aforementioned aviation RF receiver front ends though, as illustrated in FIG. 5, the aviation RF receiver back end may be disposed within the fuselage 206 of the aircraft rather than external thereto for many application settings. By one approach, and similar to the previously described antenna array, these aviation radio RF receiver front ends may be closely packed and can essentially comprise an integrated physical assembly where appropriate. In either case, as desired, the aviation RF receiver front end(s) and back end(s) can comprise a single integrated sandwich structure as suggested by FIG. 5.

As mentioned above, in many application settings there can be a plurality of aviation RF receiver front ends. In such a case, and if desired, there can be a corresponding plurality of aviation RF receiver back ends. These teachings will also accommodate, however, the use of a fewer number of aviation RF receiver back ends. As one illustrative example in this regard, a single aviation RF receiver back end can be configured and arranged to receive and process the intermediate frequency outputs of each of the plurality of aviation RF receiver front ends.

To facilitate such an approach, the outputs of the plurality of aviation RF receiver front ends can be multiplexed together to thereby form a group multiplexed output 208 which can then operably couple to a corresponding input of the aviation RF receiver back end. By one approach, this can comprise multiplexing the discrete received signal outputs for each of the aviation RF receiver front ends in frequency with one another.

Figure 6:
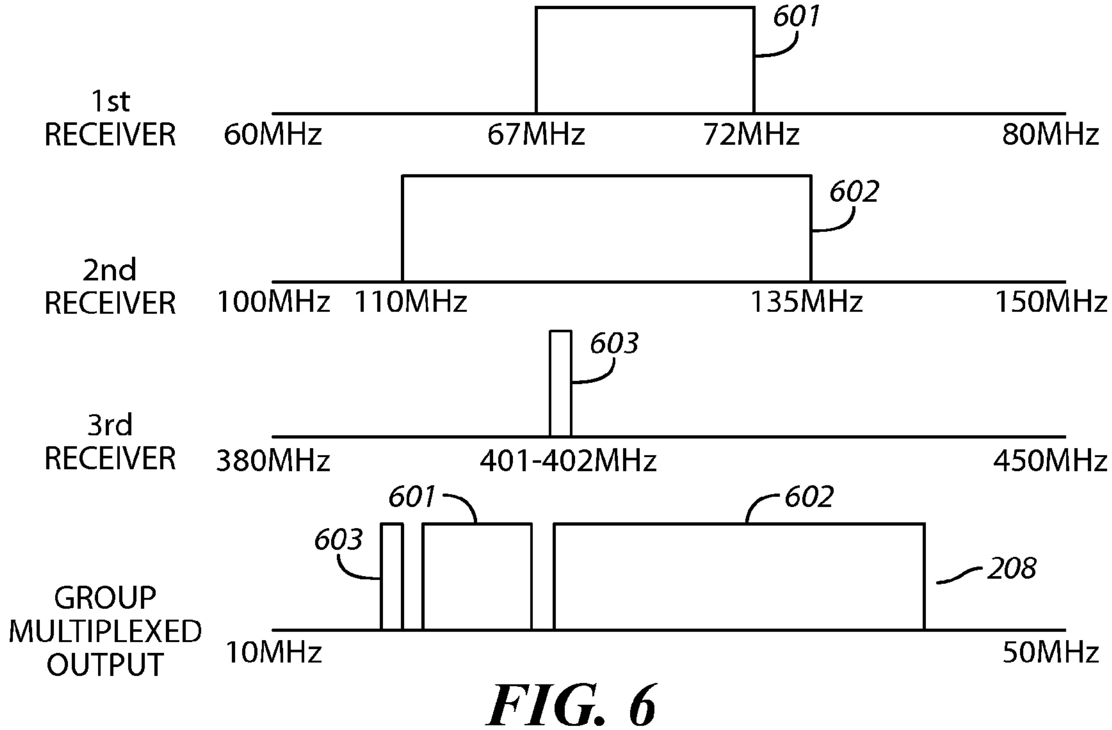
FIG. 6 comprises a series of frequency usage graphs as configured in accordance with various embodiments of the invention.

To illustrate with a simple example, and referring momentarily to FIG. 6, a first receiver can have a received signal band of interest 601 from 67 MHz to 72 MHz, a second receiver can have a received signal band of interest 602 from 110 MHz to 135 MHz, and a third receiver can have a received signal band of interest 603 from 401 MHz to 402 MHz. The aviation RF receiver front end for each such receiver can be programmed and configured to output its relevant intermediate frequency representation of those bands of interest such that, when combined into a combined group output 208, those bands of interest are multiplexed in frequency with one another and do not unduly overlap with or interfere with one another. (Those skilled in the art will recognize that the foregoing example is intended to serve only in an illustrative capacity and is not intended to comprise an exhaustive presentation in this regard or to otherwise serve as a limitation by example. It will be particularly understood that essentially any number of such bands of interest can be multiplexed in this manner.)

By this approach, a single aviation RF receiver back end 207 can receive such a group multiplexed output 208 and then de-multiplex the content to individually process, as appropriate, each band of interest. As shown in FIG. 5, this group multiplexed output 208 can pass through a corresponding hole 209 or other portal mechanism in the fuselage 206. By one approach this group multiplexed output 208 can comprise an electrical conductor such as, but not limited to, a coaxial cable or the like.

Referring again to FIG. 1, these teachings will then provide for provision 104 of an external covering that is at least partially permeable to RF signals and that will provide at least a substantial barrier against external moisture and objects. As used herein, it will be understood that the expression "external covering" refers to a covering that is configured and arranged to be disposed, at least in part, in a fixed position proximal to an exterior surface of an aircraft by either being disposed, at least in part above that exterior surface of the aircraft or by being mounted substantially flush to that exterior surface. The aforementioned antenna(s) and/or aviation RF receiver front end(s) may then be suitably configured and arranged to be deployed and fixed in place, external to the aircraft fuselage, underneath this external covering. An illustrative example of such a configuration appears in FIG. 5, where the latter two component structures 501 and 502 are mounted external to the aircraft fuselage 206 underneath such an external covering 503. By another approach, these latter component structures 501 and 502 can be located within the aircraft fuselage 206, though very proximal to the fuselage wall itself (for example, by being mounted on and in contact with that fuselage wall).

Figure 7:
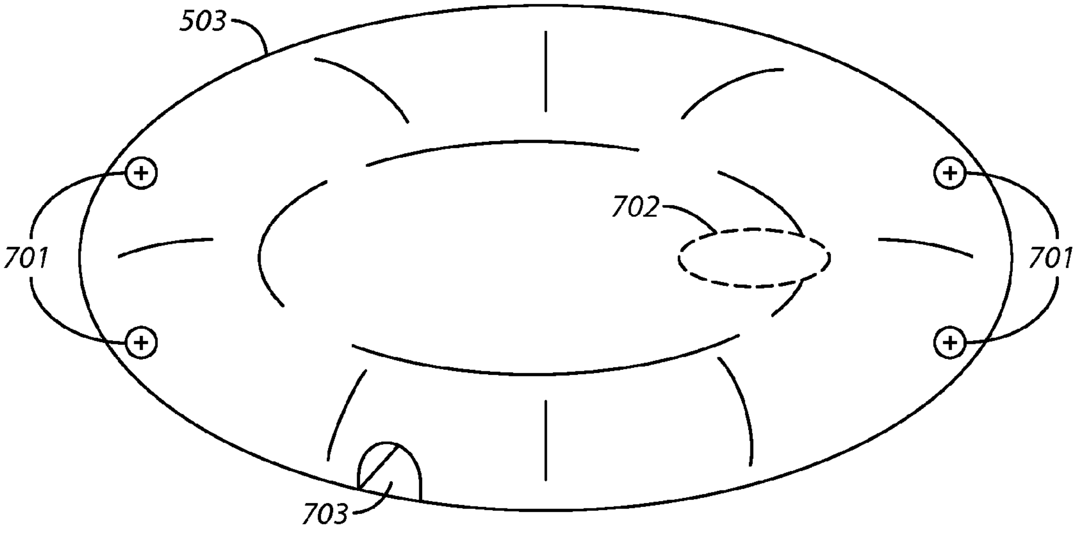
FIG. 7 comprises a top plan view as configured in accordance with various embodiments of the invention.

This external covering 503 can be aerodynamically configured and arranged to avoid presenting undue wind resistance as the aircraft moves through the atmosphere. By one approach, as suggested by both FIGS. 5 and 7, this external covering can have an aircraft-radome shape (comprising, in this particular illustrative embodiment, a low-profile, tapered-edge, oval) that can be secured to the aircraft fuselage using screws 701 or other attachment mechanisms of choice. These teachings will also accommodate using a seal (not shown) of choice between the external covering 503 and the fuselage 206 to further aid with respect to protecting the antenna(s) 501 and/or the aviation RF receiver front end(s) 502 from harm due to moisture, objects, or the like.

If desired, this external covering 503 can itself further serve to assist with electro/magnetically isolating one antenna from another. With this in mind, for example, the external covering 503 can itself be comprised of a dielectric material (or materials) of choice. With this in mind, the external covering 503 can then have one or more portions 702 thereof that are configured and arranged to have different frequency selective permeability characteristics that can in turn be leveraged to aid with the aforementioned isolation. As one example in this regard, the external covering 503 can have one or more portions 702 of varying thickness to thereby provide differing quantities of the dielectric material comprising the external covering 503 in close proximity to certain of the antennas. As another example in this regard, the external covering 503 can have one or more portions 702 that exhibit variations with respect to its material composition to thereby affect the relative amount or characteristics of the dielectric material that is proximal to a given antenna. As yet another example in this regard, such portions 702 can also vary with respect to a coating that is disposed on the external covering 503 (either on the exterior and/or interior surface of that external covering 503). Those skilled in the art will appreciate and recognize that the use of such examples is intended to serve only in an illustrative fashion and that these examples are not intended to serve as exhaustive or otherwise limiting examples in this regard.

As will be described in more detail below, it may be desired to permit a flow of ambient air to pass over the aforementioned phosphor material 313 that is located underneath this external covering 503. Such a configuration can be leveraged, for example, to permit air speed of the aircraft to be measured. To facilitate such an approach, the external covering 503 can have a small pneumatic pathway 703 disposed there through to permit air to enter at one end and to exit at the other. The location of this pneumatic pathway 703 can coincide with the location of the phosphor material 313 to permit direct exposure of the latter to this passage of air.

By one approach, these teachings permit the placement of densely packed antennas and their corresponding radios to be placed, in whole or in part, proximal to an exterior surface of an aircraft. In many application settings, of course, such an approach may result in a placement of these components in a location that is not necessarily readily accessible to a pilot, co-pilot, navigator, or other crew member. In this case, if desired, these teachings will readily support coupling one or more outputs of the aviation RF receiver back end 207 to one or more user interfaces 209 that are installed and located in the aircraft's cockpit 210 to thereby render that information in usable form conveniently to relevant crew members. Such a user interface 209 might comprise, for example, a pixilated display (not shown) that provides the received information in graphical form to an onlooker. Various such user interfaces are well known in the art and others are likely to be developed going forward. As these teachings are not particularly sensitive to the selection of any particular approach in this regard, for the sake of brevity further elaboration regarding such components will not be provided here.

By one approach, the aforementioned components can be powered by electricity that is delivered via an electrical conductor. This, of course, comprises a typical approach that would well accord with prior art practice in this regard. It would also be possible, however, to power such components by delivering light (via, for example, a light carrying pathway such as optical fiber) to or near the component and then converting that light into electricity. Examples of such an approach in an aviation context can be found in the following pending U.S. patent applications, the contents of which are fully incorporated herein by this reference:

Apparatus and Method Pertaining to Light-Based Power Distribution in a Vehicle filed on Oct. 16, 2006 and having application Ser. No. 11/549,887;

Apparatus and Method Pertaining to Light-Based Power Distribution in a Vehicle filed on Oct. 16, 2006 and having application Ser. No. 11/549,891;

Apparatus and Method Pertaining to Provision of a Substantially Unique Aircraft Identifier Via a Source of Power filed on Oct. 16, 2006 and having application Ser. No. 11/549,899; and Apparatus and Method Pertaining to Light-Based Power Distribution in a Vehicle filed on Oct. 16, 2006 and having application Ser. No. 11/549,904.

It would also be possible to convey the aforementioned output of the aviation RF receiver back end 207 to, for example, one or more user interfaces 209 using an electricity-conveying pathway (such as copper wiring) and a corresponding signaling protocol of choice. In this case, however, it would also be possible to convey such data using one or more modulated light carriers. Examples of such an approach in an aviation context can be found in the following pending U.S. patent applications, the contents of which are fully incorporated herein by this reference:

Method and Apparatus for Handling Data and Aircraft Employing Same filed on Aug. 14, 2006 and having application Ser. No. 11/464,291;

Method and Apparatus for Handling Data and Aircraft Employing Same filed on Aug. 14, 2006 and having application Ser. No. 11/464,308; and Method and Apparatus for Handling Data and Aircraft Employing Same filed on Aug. 14, 2006 and having application Ser. No. 11/464,321.

Figure 8:
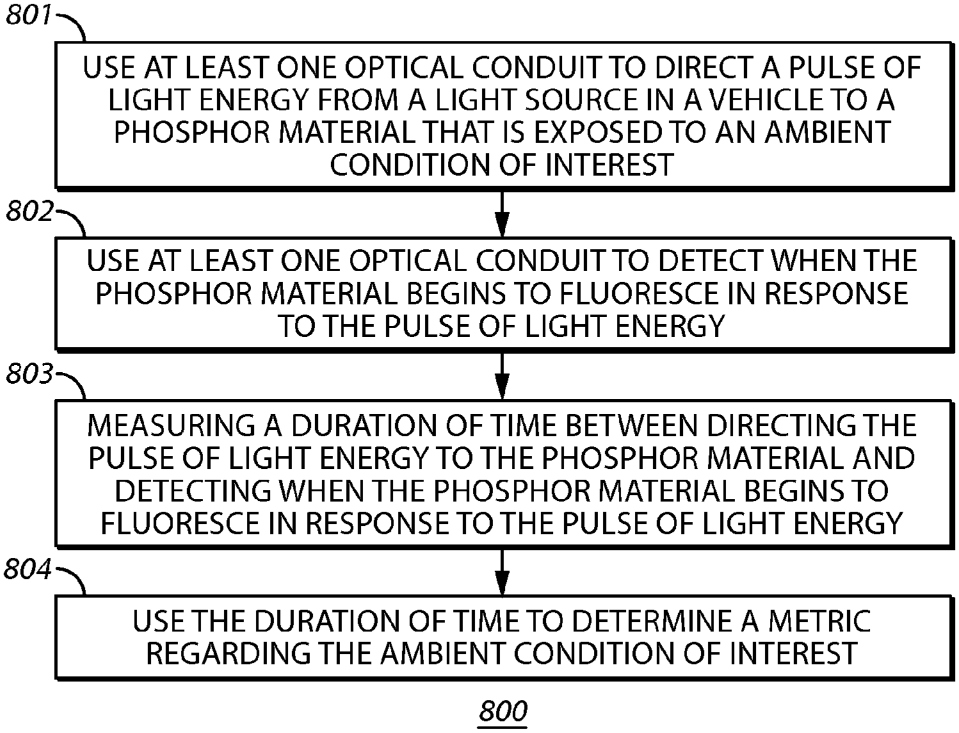
FIG. 8 comprises a flow diagram as configured in accordance with various embodiments of the invention.
Figure 9:
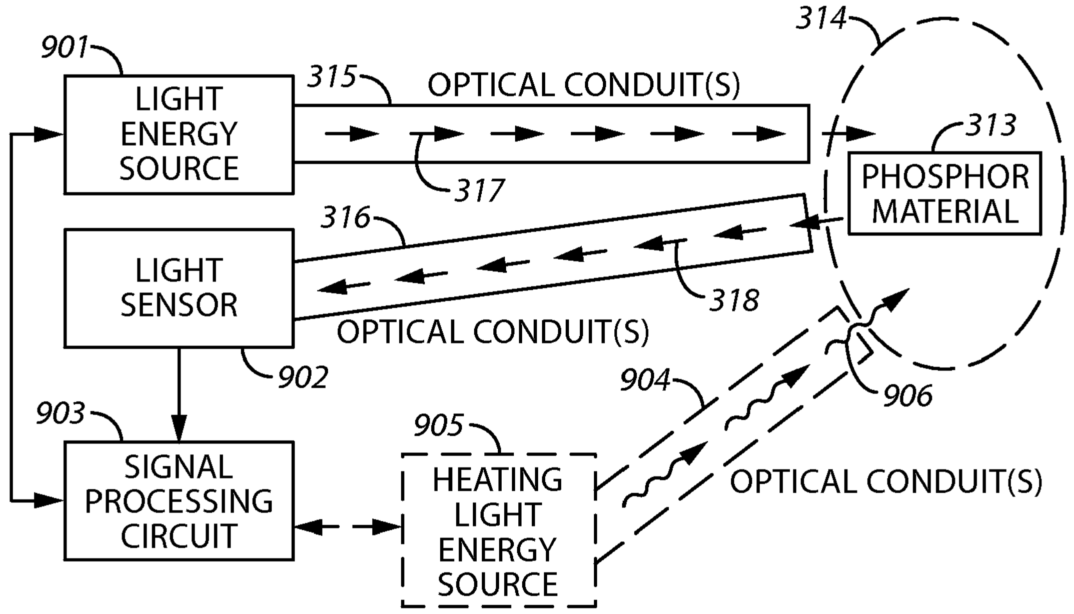
FIG. 9 comprises a block diagram as configured in accordance with various embodiments of the invention.

Referring now to FIGS. 8 and 9, further details will be provided with respect to using the aforementioned phosphor material 313 to good effect.

A corresponding process 800 provides for using 801 the aforementioned optical conduit 315 to direct a pulse of light energy 317 from a light energy source 901 to the phosphor material 313 that is exposed to an ambient condition of interest 314. The light energy source 901 can be located proximal to the ambient condition of interest 314 if desired (for example, by disposing the light energy source 901 underneath the external covering 503). More typically, however, it may be preferred to locate and mount the light energy source 901 within, for example, an equipment bay or the like that is located remotely (i.e., in a different compartment) from the ambient condition of interest 314. When the optical conduit 315 comprises an optical fiber (such as a glass or a plastic optical fiber as are known in the art), those skilled in the art will recognize and appreciate that the pulse of light energy 317 can be delivered to the phosphor material 313 notwithstanding a relatively significant distance between the source and target in a convenient and inexpensive manner.

These teachings will also accommodate providing two or more of these light energy sources 901. This can provide for redundant back-up capabilities and/or a greater overall instantaneous power output, as desired.

The frequency(ies) of the light energy 317 selected for use in a given application setting can vary at least with respect to the particular phosphor material 313 being employed in that application setting. As many phosphorous materials will fluoresce when exposed to ultraviolet light, by one approach, this pulse of light energy 317 can comprise, at least in part, ultraviolet light. As various phosphorous materials will fluoresce when exposed to varying frequencies of light energy, the particular frequency(ies) employed in a given setting will of course vary with the material utilized. There are, for example, known materials that will fluoresce when exposed to light energy outside the ultraviolet range.

This process 800 then provides for using 802 the second optical conduit 316 to detect (via, for example, a light sensor 902) when the phosphor material 313 begins to fluoresce in response to the pulse of light energy 317. In particular, this optical conduit 316 can direct such resultant fluorescent light energy 318 to a light sensor 902 to thereby permit the detection of this event.

It may be noted that FIG. 9 presents only a single optical conduit 315 and 316, respectively, to convey the pulse of light energy 317 to the phosphor material 313 and the resultant fluorescent light energy 318 to the light sensor 902. By one approach, if desired, and presuming the use of appropriate light path components as exist and as are well understood by those skilled in the art, only a single optical conduit can serve both roles. It would also be possible to employ of plurality of optical fibers for either or both of these optical pathways. Such options will be well understood by those skilled in the art and require no further elaboration here.

It may also be noted that any of a wide variety of lenses, light pipes, diffusion components, and the like (not shown) could be employed, if desired, to disperse the incoming pulse of light energy over a wide portion of the phosphor material and/or to collect the emitted fluorescent light for conveyance to the light sensor. Again, such components and their manner of use will be well understood by those skilled in the art. Accordingly, for the sake of brevity and simplicity further explanation in this regard will not be provided here.

The aforementioned light sensor 902 can be located proximal to the phosphor material 313 (and hence beneath the aforementioned covering) if desired, but may also be located elsewhere in the aircraft as again the fluorescent emissions 318 of the phosphor material 313 can be suitably and effectively conveyed a considerable distance by the aforementioned optical conduit(s) 316.

This process 800 then accommodates using a signal processing circuit 903 that operably couples to both the light energy source 901 and the light sensor 902 to measure 803 a duration of time between directing the pulse of light energy 317 to the phosphor material 313 and detecting when the phosphor material 313 begins to fluoresce in response to that pulse of light energy 317. In fact, there will be a non-zero amount of time between these two events as the phosphor material 313 will not respond instantaneously to the stimuli of the pulse of light energy 317. More particularly, there will be a predictable amount of delay between these two events that is largely dependent upon the temperature of the phosphor material 313. By knowing the particular phosphor material being utilized in a given application setting, one can also know the characteristic delays for that particular material as correspond to various temperatures.

Accordingly, this process 800 will then further accommodate having this signal processing circuit 903 use 804 this determined duration of time to thereby determine a metric regarding the ambient condition of interest. In this particular embodiment and example, this can readily comprise determining the temperature of the phosphor material 313 and hence the ambient temperature (where it may be presumed that the ambient temperature is sufficiently close to the phosphor material temperature). In particular, the calculated duration of time between sourcing the pulse of light energy 317 and detecting the resultant fluorescent light energy 318 can be used with a corresponding calculation, look-up table, or the like to identify a corresponding temperature as corresponds to that duration of response latency.

In this illustrative embodiment the signal processing circuit 903 can comprise a wholly or partially programmable platform if desired. It is also possible (and possibly preferably in various operational paradigms), however, that the signal processing circuit 903 comprise a hardware-based platform such as a Field Programmable Gate Array (FPGA) or an Application Specific Integrated Circuit (ASIC). As used herein, this will be understood to refer to a signal processing platform having logic elements that are each comprised of dedicated corresponding hardware components. In particular, it will be understood that this reference to a hardware-based platform specifically refers to a processing platform that lacks executable soft-coded program instructions (where the latter are understood to comprise software-based instructions as versus hard-wired components).

So configured and arranged, those skilled in the art will recognize and appreciate that a metric regarding an ambient condition of interest can be remotely sensed based upon using only the intervening transport of light. This, in turn, permits the phosphor material 313 to be mounted without requiring the use of expensive and potentially troublesome electrical conductors such as copper wiring.

Figure 10:
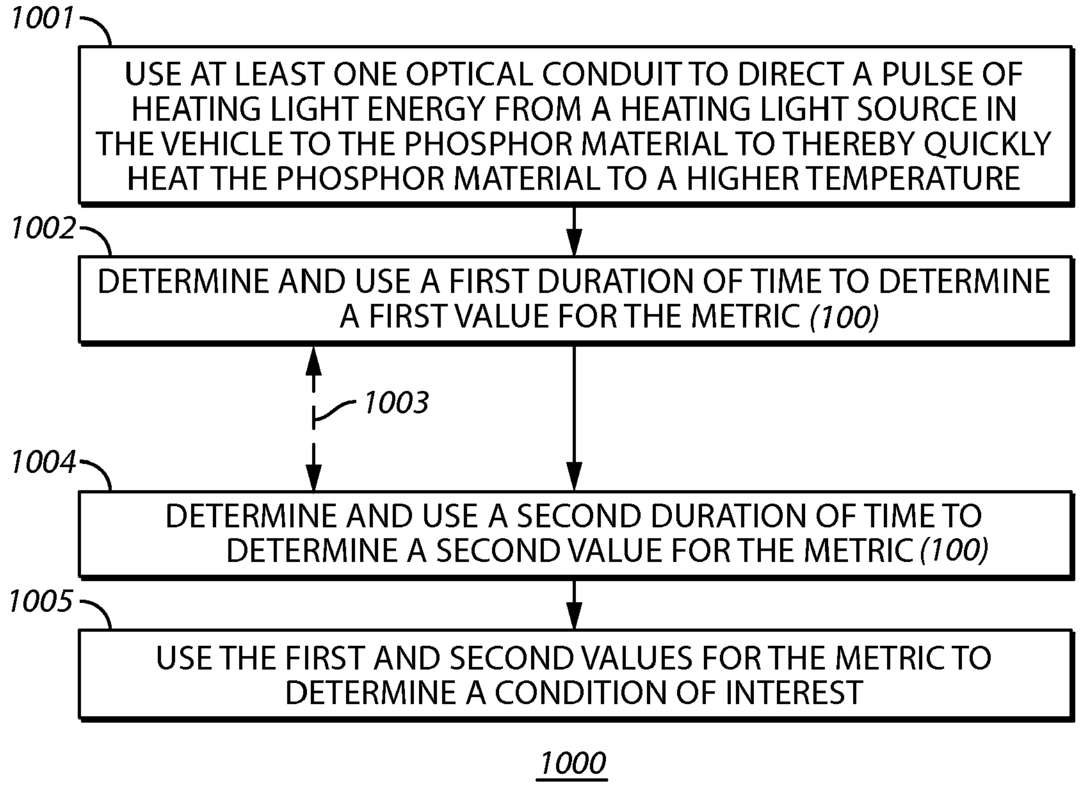
FIG. 10 comprises a flow diagram as configured in accordance with various embodiments of the invention.

These teachings will also accommodate using the described process 800 as a component step of yet other processes to determine other conditions of interest. As an illustrative example in this regard, and referring now to FIG. 10 (and with continued reference to FIG. 9), such a process 1000 will be described.

Pursuant to this process 1000, the above-described process 800 then provides for using 1001 at least one optical conduit 904 to direct a pulse of heating light energy 906 from a heating light source 905 to the phosphor material 313 to thereby quickly heat the phosphor material 313 to a higher temperature (i.e., to a temperature higher than what the ambient conditions for the phosphor material 313 would otherwise ordain).

As before, this optical conduit 904 can comprise an optical fiber (comprised as desired of glass or plastic) and may in fact comprise a plurality of such fibers as may be useful to deliver a sufficient amount of heating energy to the phosphor material 313 to achieve the desired temperature rise within the desired period of time. Also as before, the heating light energy source 905 can be located proximal to the phosphor material 313 or can be located a considerable distance away as desired. For example, in many cases, optical fibers will effectively deliver a largely unattenuated light signal for distances of up to 100 meters or more (depending in some cases upon the frequency(ies) of the light energy itself). Also as before, this optical conduit 904 may be combined with any of the previously described optical conduits (315 and 316) as are also employed for other purposes.

By one approach, this heating light energy source 905 is also operably coupled to the signal processing circuit 903. So configured, the functionality and activities of the former can be at least partially controlled by the latter. Also by one approach, this heating light energy source 905 can provide heating light energy in the infrared spectral range.

The instantaneous amount of heating energy delivered to the phosphor material 313, and the duration of the delivery, can vary with the needs and/or opportunities presented in a given application setting as will be well understood by those skilled in the art.

This process 1000 then determines and uses 1002 a first duration of time to thereby determine a first value for a metric of interest. In this example, this metric of interest comprises the temperature in the ambient vicinity 314 of the phosphor material 313.

Following a brief predetermined interval T (as denoted by reference numeral 1003, which can be on the order of a few tens of milliseconds (or less or more as desired), this process 1000 then provides for again using the first described process 800 at step 1004 to again, in this example, determine a second value for the metric of choice (in this example, the temperature as pertains to the phosphor material 313). The signal processing circuit 903 can then use 1005 these first and second determined values for the metric of choice to determine another condition of interest. For example, by positioning the phosphor material 313 in such a way as to be exposed to a flow of external air (such as the flow of air along the aforementioned pathway 703), wherein that flow is a predictable function of the speed of air flowing past the aircraft, the difference in temperature of the phosphor material 313 before and after the application of the heating energy can serve to determine the quantity of air that has flowed past the phosphor material 313 to influence the observed temperature results.

Numerous variations with respect to such a process can of course be accommodated. By one approach, for example, more than two such temperature readings can then be taken at given intervals to observe the cooling behaviors of the phosphor material 313 via a greater number of data points. The latter, in turn, can serve to make a more accurate determination regarding, in this example, airspeed.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. An antenna array with integrated light-based temperature sensor for use in an aviation application setting, comprising:

an external covering that is at least partially permeable to radio frequency signals and that will provide at least a substantial barrier against external moisture and objects, and wherein the external covering is configured and arranged to be disposed, at least in part, in a fixed position proximal to an exterior surface of an aircraft;

at least four radio frequency antennas that are disposed underneath and protected by the external covering, wherein the at least four radio frequency antennas are electrically discrete from one another and are each configured and arranged to receive radio frequency signals for a corresponding different radio frequency platform and wherein the at least four radio frequency antennas are configured and arranged as an integral mechanical structure;

a phosphor material that is also disposed underneath and protected by the external covering and that is exposed to an ambient condition of interest.

2. The antenna array with integrated light-based temperature sensor of claim 1 wherein the external covering is aerodynamically configured and arranged to avoid presenting undue wind resistance as the aircraft moves through an atmosphere.

3. The antenna array with integrated light-based temperature sensor of claim 1 wherein the external covering is comprised, at least in part, of a dielectric material.

4. The antenna array with integrated light-based temperature sensor of claim 3 wherein the external covering is configured and arranged to have areas of varying thickness to thereby substantially aid in electro/magnetically isolating at least one of the antennas from another of the antennas by providing differing quantities of the external covering in close proximity to certain of the antennas.

5. The antenna array with integrated light-based temperature sensor of claim 1 wherein the external covering has portions thereof that are configured and arranged to have different frequency selective permeability characteristics to thereby aid in electro/magnetically isolating at least one of the antennas from another of the antennas.

6. The antenna array with integrated light-based temperature sensor of claim 5 wherein the external covering has portions thereof that are configured and arranged to have different frequency selective permeability characteristics as a function, at least in part, of at least one of:

variations with respect to relative thickness of the portions of the external covering;

variations with respect to material composition of the portions of the external covering;

variations with respect to a coating disposed on the external covering.

7. The antenna array with integrated light-based temperature sensor of claim 1 wherein the at least four radio frequency antennas are further configured and arranged to be disposed between the external covering and the exterior surface of the aircraft.

8. The antenna array with integrated light-based temperature sensor of claim 1 wherein the at least four radio frequency antennas share a common component substrate.

9. The antenna array with integrated light-based temperature sensor of claim 1 wherein the radio frequency antennas each comprise a discrete microstrip patch antenna.

10. The antenna array with integrated light-based temperature sensor of claim 1 wherein each of the at least four radio frequency antennas has a corresponding integral ground plane.

11. The antenna array with integrated light-based temperature sensor of claim 10 wherein the integral ground planes are each electrically coupled in common with one another.

12. The antenna array with integrated light-based temperature sensor of claim 1 further comprising:

an electro/magnetic shield disposed between at least two of the radio frequency antennas to increase electro/magnetic isolation therebetween.

13. The antenna array with integrated light-based temperature sensor of claim 1 further comprising:

at least one broadband radio frequency antenna that is also disposed underneath and protected by the external covering, wherein the at least one broadband radio frequency antenna is configured and arranged to receive radio frequency signals for a corresponding plurality of different radio frequency platform.

14. The antenna array with integrated light-based temperature sensor of claim 1 wherein the different radio frequency platforms comprise at least one of:

a global positioning system receiver;

a very high frequency (VHF) two-way voice communications transceiver;

a marker beacon receiver;

a VHF Omni-directional Range (VOR) receiver;

an aircraft transponder transceiver;

an Instrument Landing System (ILS) receiver comprised of a localizer receiver and a glideslope receiver;

an aircraft emergency locator transmitter (ELT);

an aircraft satellite communications receiver (SatCom);

a Traffic Alert Collision Avoidance System (TCAS) receiver;

an Automatic Dependent Surveillance-Broadcast (ADS-B) receiver;

a data link weather receiver;

a cellular telephony transceiver;

a satellite-based commercial broadcast receiver.

15. The antenna array with integrated light-based temperature sensor of claim 1 further comprising:

for each of the different radio frequency platforms, a corresponding aviation radio frequency receiver front end comprising at least in part an antenna input through an intermediate frequency section, wherein the antenna input for each such aviation radio frequency receiver front end is coupled to a corresponding one of the radio frequency antennas to facilitate inputting a received signal to the aviation radio frequency receiver front end and wherein the aviation radio frequency receiver front ends are also disposed underneath and protected by the external covering.

16. The antenna array with integrated light-based temperature sensor of claim 15 further comprising:

at least one aviation radio frequency receiver back end that operably couples to at least one of the aviation radio frequency receiver front ends, wherein the at least one aviation radio frequency receiver back end is disposed closely proximal to the at least one of the aviation radio frequency receiver front ends.

17. The antenna array with integrated light-based temperature sensor of claim 16 wherein a single aviation radio frequency receiver back end operably couples to each of the aviation radio frequency receiver front ends to demodulate received content from each of the aviation radio frequency receiver front ends.

18. The antenna array with integrated light-based temperature sensor of claim 1 further comprising:

at least a first optical conduit operably coupled between a source of light energy and the phosphor material;

at least a second optical conduit operably coupled between the phosphor material and a light sensor;

such that a signal processing circuit connected to the second optical conduit can:

determine via the light sensor when the phosphor material begins to fluoresce in response to the pulse of light energy;

measure a duration of time between a sourcing of the pulse of light energy to the phosphor material and when the phosphor material begins to fluoresce in response to the pulse of light energy; and use the duration of time to determine a metric regarding the ambient condition of interest.

19. The antenna array with integrated light-based temperature sensor of claim 18 wherein the first optical conduit shares at least one optical pathway with the second optical conduit.

20. The antenna array with integrated light-based temperature sensor of claim 18 further comprising:

a radio frequency receiver front end that is connected to at least one of the radio frequency antennas, wherein the radio frequency receiver front end further includes the signal processing circuit.

* * * * *